United States Patent [19]

Williamson

[11] Patent Number: 5,280,286
[45] Date of Patent: Jan. 18, 1994

[54] SURVEILLANCE AND IDENTIFICATION SYSTEM ANTENNAS

[75] Inventor: John D. Williamson, Los Gatos, Calif.

[73] Assignee: Smart Tag Systems, Inc., Akron, Ohio

[21] Appl. No.: 898,020

[22] Filed: Jun. 12, 1992

[51] Int. Cl.$^5$ ............................................. G01S 13/74
[52] U.S. Cl. ........................................ 342/44; 342/364
[58] Field of Search ............... 342/364, 366, 42, 44; 340/572

[56] References Cited

U.S. PATENT DOCUMENTS

| | | | |
|---|---|---|---|
| 3,745,569 | 7/1973 | Works et al. | |
| 4,063,229 | 12/1977 | Welsh et al. | 340/280 |
| 4,471,344 | 9/1984 | Williams | 340/572 |
| 4,527,152 | 7/1985 | Scarr et al. | 340/572 |
| 4,633,250 | 12/1986 | Anderson, III et al. | 342/27 |
| 4,679,046 | 7/1987 | Curtis et al. | 342/51 |
| 4,700,179 | 10/1987 | Fancher | 340/572 |

OTHER PUBLICATIONS

A. Kumar & H. D. Hristov, Microwave Cavity Antennas, pp. vii-ix & 101-107 (1989).
S. Drabowitch & C. Ancona, Antennas vol. 2 Applications, pp. 176-177 (1988).
Thomas A. Milligan, Modern Antenna Design, p. 77 (1985).
Y. T. Lo & S. W. Lee, Antenna Handbook Theory, Applications, and Design, pp. 17-137-17-139 (1988).
Constantine A. Balanis, Antenna Theory Analysis and Design, pp. 330-332 (1982).
Edward C. Jordan & Keith G. Balmain, Electromagnetic Waves and Radiating Systems, pp. 513-519 (2nd Edition, 1968).

*Primary Examiner*—Theodore M. Blum
*Attorney, Agent, or Firm*—Renner, Kenner, Greive, Bobak, Taylor & Weber

[57] ABSTRACT

An antenna system (20) in transponder article surveillance and identification system (10) employs a separate interrogating transmitting antenna (31) and interrogating receiving antenna (41) both of which are circularly polarized in opposite hand senses whereby very little of a transmitted electromagnetic interrogation signal is coupled to the interrogation receiving antenna (41) and reflections from nearby surfaces are transparent, significantly improving system performance. Interrogating transmitting antenna (31) and interrogating receiving antenna (41) are cavity-backed, crossed-dipole-fed antennas producing a substantially hemispherical radiation pattern. Transponder (11) is mounted together with a dipole antenna (50) on a tag (13) carried on each article to be identified. Dipole antenna (50) includes two substantially paddle-shaped radiating members (52,53) formed upon a substrate (54), each paddle-shaped radiating member (52, 53) having an end centrally disposed on substrate (54) terminating at an angle whereby the impedance of dipole antenna (50) substantially matches the impedance of the transponder (12) in electrical connection therewith.

12 Claims, 1 Drawing Sheet

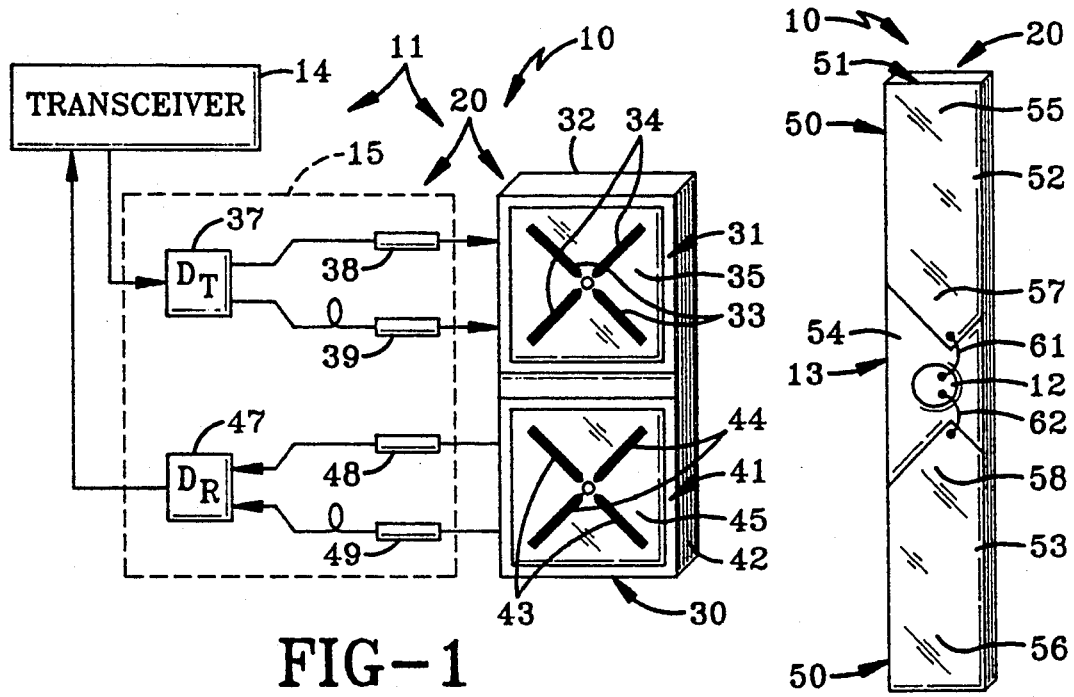
FIG-1
FIG-3
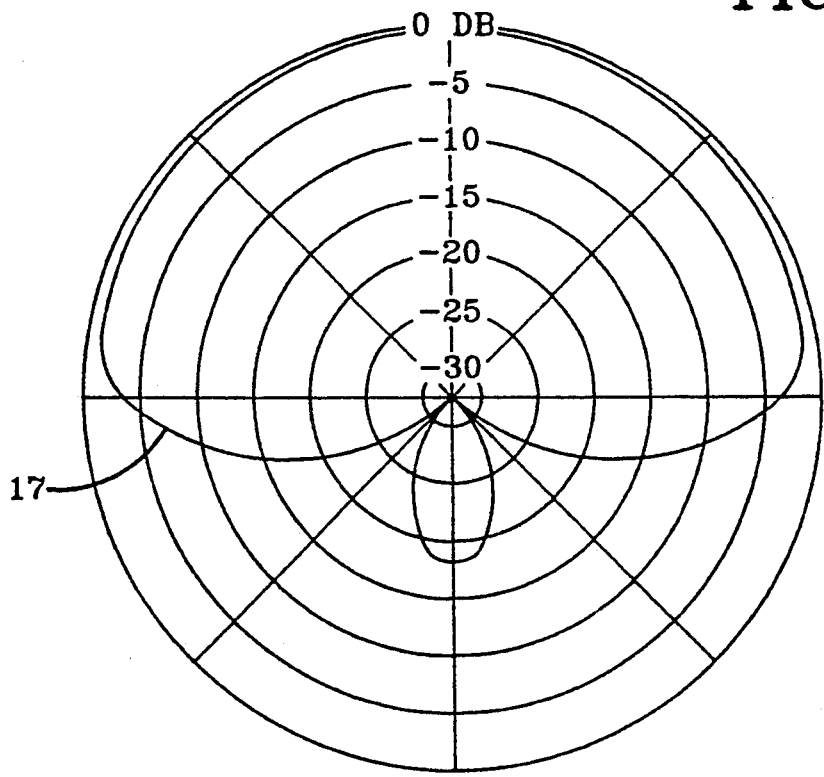
FIG-2

SURVEILLANCE AND IDENTIFICATION SYSTEM ANTENNAS

TECHNICAL FIELD

The present invention relates in general to devices for transmitting and receiving electromagnetic signals. More particularly, the present invention pertains to transponder systems utilized for surveillance and identification of articles (both animate and inanimate). More specifically, the present invention relates to antennas employed in surveillance and identification systems having one or more interrogating transmitting and receiving (or transceiving) antennas and a transponder antenna.

BACKGROUND ART

In the fields of remote data collection and processing, electronic article surveillance and automatic identification are most successfully accomplished by employing an interrogator that generates an electromagnetic signal throughout a limited space. The electromagnetic signal is received, modified to include identification information and reradiated by a transponder within a tag carried by each article in the radiated space. If conditions are acceptable, the interrogator receives the reradiated signal; if not, no identification or an incorrect identification result.

Prominent in effecting reliable, correct identification is the performance of the antennas utilized by the interrogator and the tag. Unfortunately, in many applications the articles carrying the tags often position the tag antenna while in the interrogation space in an orientation creating a polarization mismatch between the antennas, effectively substantially reducing energy transfer therebetween.

Efforts have been made to reduce the extent of polarization mismatch or otherwise increase the coupling between the antennas of the interrogator and tag. Many of these efforts have centered around configuring the interrogator antenna to monitor for multiple polarizations by either phasing the interrogator antenna or using multiple antennas of differing polarizations. It has also been suggested that the reradiated signal from the tag antenna be circularly polarized. However, phased or multiple antenna configurations are as large or larger than planar polarized antennas, more costly and difficult to manufacture and operate, and have poor gain and directivity. Moreover, the physical constraints that applications place on tag characteristics make manufacture of a circularly polarized tag antenna impracticable and equally performance limited.

Both the interrogator antenna and tag antenna should be as small as possible and simple and easy to manufacture. Equally important, the interrogator antenna should provide a hemispherical radiation field with good gain in the forward direction and low gain to the sides and back in order to facilitate optimal coupling to the tag antenna whose polarization orientation may change at random as the article carrying the tag moves through the interrogation space. The tag antenna should directly couple to the transponder circuitry with which it operates with a high degree of impedance matching.

SUMMARY OF THE INVENTION

It is, therefore, an object of the present invention to provide an antenna system for article surveillance and identification including an interrogating antenna system that facilitates optimal coupling to a transponder antenna for substantially all polarization orientations of the transponder antenna.

It is another object of the present invention to provide an antenna system for article surveillance and identification, as set forth above, wherein the interrogating antenna system provides a substantially uniform hemispherical radiation field with good gain in the forward direction and low gain to the sides and back.

It is still another object of the present invention to provide an antenna system for article surveillance and identification, as set forth above, wherein the interrogating antenna system is small, and facilitates inexpensive manufacture.

It is yet another object of the present invention to provide an antenna system for article surveillance and identification, as set forth above, wherein the tag antenna directly couples to the transponder circuitry with which it operates with a high degree of impedance matching.

It is a further object of the present invention to provide an antenna system for article surveillance and identification, as set forth above, wherein the tag antenna is small and facilitates inexpensive manufacture.

These and other objects and advantages of the present invention over existing prior art forms will become more apparent and fully understood from the following description in conjunction with the accompanying drawings.

In general, in a system for article surveillance and identification, an antenna system includes an interrogating transmitting antenna, a transponder antenna and an interrogating receiving antenna. The interrogating transmitting antenna radiates an electromagnetic interrogation signal having an elliptical polarization in a first-handed direction; the transponder antenna receives the electromagnetic interrogation signal and reradiates a modified electromagnetic interrogation signal having an linear polarization; and the interrogating receiving antenna, having a elliptical polarization in a direction opposite to that of said first-handed direction, receives the modified electromagnetic interrogation signal.

A transponder interrogator antenna system for article surveillance and identification includes an interrogating transmitting antenna for radiating an electromagnetic interrogation signal having an elliptical polarization in a first-handed direction, and, an interrogating receiving antenna having an elliptical polarization in a direction opposite to that of said first-handed direction for receiving a modified electromagnetic interrogation signal.

A transponder antenna system for article surveillance and identification includes a transponder antenna for receiving an electromagnetic interrogation signal and reradiating a modified electromagnetic interrogation signal having a linear polarization. The transponder antenna includes a dipole antenna having two substantially paddle-shaped radiating members formed upon a substrate, each paddle-shaped radiating member having an end centrally disposed on the substrate terminating at an angle whereby the impedance of the dipole antenna substantially matches the impedance of the transponder circuit in electrical connection therewith.

BRIEF DESCRIPTION OF THE DRAWING

FIG. 1 presents in partial block diagram and pictorial view the portion of a surveillance and identification system including an interrogator having an exemplary interrogator antenna subsystem in accordance with the concepts of the present invention, and illustrates exemplary similar interrogator transmitting and interrogator receiving antennas.

FIG. 2 presents the radiation pattern of the exemplary identical interrogator transmitting and interrogator receiving antennas illustrated in FIG. 1.

FIG. 3 presents in pictorial view the portion of a surveillance and identification system including a transponder having an exemplary tag antenna subsystem in accordance with the concepts of the present invention.

PREFERRED EMBODIMENT FOR CARRYING OUT THE INVENTION

FIGS. 1 and 3 together present in partial block diagram and pictorial view a surveillance and identification system, indicated generally by the numeral 10 (hereinafter called ID system 10). ID system 10 generally includes an interrogator 11 (FIG. 1) for generating an electromagnetic interrogation signal to detect the presence of and identify any article within a preselected interrogation space, and a transponder 12 (FIG. 3) one of which is carried as a tag 13 by each article to be identified. Transponder 12 receives the interrogation signal from interrogator 11, modifies the same so as to identify the article, and reradiates the modified interrogation signal. Interrogator 11, which may include a separate transmitter and receiver or a combined transceiver 14, receives and processes the modified interrogation signal from transponder 12, furnishing an indication and identification of all articles carrying tag 13 within the interrogation space.

The presentation of ID system 10 in FIGS. 1 and 3 includes an exemplary antenna system, indicated generally by the numeral 20, in accordance with the concepts of the present invention. Antenna system 20 includes broadly an interrogator antenna subsystem 30 illustrated in FIG. 1, and a tag antenna subsystem 50 illustrated in FIG. 3.

Interrogator antenna subsystem 30 includes an interrogating transmitting antenna 31 and a similar interrogating receiving antenna 41. Interrogating transmitting antenna 31 includes a cavity-backed, crossed-dipole-fed antenna formed of a half-wavelength cavity reflector 32 having substantially rectangular cross-section, and two dipoles 33,34 crossed at ninety degrees relative to the other mounted within and in operative association with cavity reflector 32. Crossed dipoles 33, 34 may be etched out of a thin sheet of copper or other suitable conductive material applied as a foil to one side of a glass epoxy or any other suitable non-conductive substrate 35, thereby facilitating manufacture and assembly of interrogator antenna subsystem 30.

Interrogator transmitting antenna 31 may be electrically connected to transceiver 14 utilizing a connecting circuit 15 including a conventional power divider $D_T 37$ and two quarter-wavelength sleeve or other suitable type of baluns 38,39, one (balun 38) of which is electrically connected in a cable one-quarter wavelength longer than the other so as to provide a ninety degree phase shift (but no change in amplitude) to one of the dipoles 33,34.

Configured and connected in this manner, crossed dipoles 33,34 generate two orthogonal signals, producing an electromagnetic wave (in a normal direction) of circular polarization that, depending upon dipole 33,34 physical orientation, may have either a right-hand or left-hand sense. Such cavity-backed, crossed-dipole-feed configuration provides an interrogating transmitting antenna 31 that is small and lightweight, of simple mechanical design, easy and inexpensive to manufacture, produces high-gain, possesses an impedance easy to match to its feeding transmission lines, and produces precisely the directivity optimal for coupling to a randomly oriented tag antenna. The radiation pattern 17 for interrogating transmitting antenna 31, shown in FIG. 2, is substantially hemispherical within only a few decibels. It has been found that for an interrogating transmitting antenna 31 constructed with a center frequency of 915 MHz, cavity reflector 32 is about 8 inches square and about 3 inches deep, forward power gain is between 4 and 6 Decibels, the axial power ratio is about 20 Decibels, the resulting SWR is lower than 1.3, and operation may be had over a 50 Mhz range around the center frequency.

Interrogator receiving antenna 32 is substantially the same in construction and configuration as that of interrogator transmitting antenna 31, except as is required for a polarization having an opposite sense than that of interrogator transmitting antenna 31. Thus, interrogator receiving antenna 32 may be seen in FIG. 1 to include its own cavity reflector 42 which may be integrally manufactured with cavity reflector 32, crossed dipoles 43,44, and substrate 45. Connecting circuit 15 further includes a conventional power divider $D_R 47$ and two quarter-wavelength sleeve or other suitable type of baluns 48,49, one (balun 48) of which is electrically connected in a cable one-quarter wavelength longer than the other so as to provide a ninety degree phase shift to one of the dipoles 43,44.

Use of separate interrogator transmitting and receiving antennas with opposite polarization senses substantially reduces transmitter-receiver coupling, and receiver overloading and desensitization, because antennas polarized with opposite senses couple only weakly to each other. In the example hereinbefore centered around 915 MHz, this coupling has been found to be about $-30$ Decibels. Moreover, where, for example, interrogator transmitting antenna 31 is lefthand circularly polarized and interrogator receiving antenna 32 is right-hand circularly polarized, reflections from nearby reflective surfaces will be substantially transparent to interrogator receiving antenna 32 while the linearly polarized reradiated signal from transponder 12 will be quite electromagnetically visible.

The exemplary tag antenna subsystem 50 shown in FIG. 3 includes dipole 51 having two paddle-shaped radiator elements 52,53, fixed to one side of the ends of rectangular substrate 54 in the center of which is mounted transponder 12. Each paddle-shaped radiator member 52,53 may be seen to include a rectangular flat-strip section 55,56, respectively, disposed outwardly of the ends of substrate 54, and a triangular section 57,58, respectively, disposed toward the central section of substrate 54. Transponder 12 may be sealed within a JEDEC TO-style package or other suitable enclosure. Conductive leads 61,62 extending from transponder 12 through the TO-style package are electrically connected as by soldering to the pointed ends of radiator elements 52, 53.

The skilled artisan should appreciate in particular two aspects of tag antenna subsystem 50. First, the provision of flat-strip sections 55,56 of radiating members 52,53 significantly increases tag antenna subsystem 50 capacitance, maximizing the antenna's electrical length and bandwidth for minimum physical length. At a center frequency of 915 Mhz, use of substrate 54 having an overall size of about 4.75 inches long by 1 inch wide by 0.04 inch thick provides acceptable detection range and electrical characteristics for a wide variety of surveillance and identification system applications. Second, adjustment of the angle at the end of the triangular section 57,58 of radiating members 52,53 varies antenna impedance allowing convenient matching to transponder 12. Triangular sections 57,58 also serve as low frequency leads with no additional radio frequency isolation required. In the example given herein, a 73 Ohm antenna impedance has been matched to a transponder 12 having an impedance of 50 Ohms.

Operation of system 10 is cyclic, and is begun with the generation by transceiver 14 of a suitable electromagnetic interrogation signal, its passage through connecting circuit 15 and its radiation by interrogator transmitting antenna 31, producing, for example, a right-handed circularly polarized field. The receiving portion of transceiver 14 is unaffected because little energy is coupled to the separate interrogator receiving antenna 32 having opposite, lefthand circular polarization, and false reflections from nearby surfaces are of opposite polarization and will be ignored. When a tag 13 including transponder 12 and tag antenna subsystem 50 are brought within the interrogation space, the electromagnetic interrogation signal is received and modified by transponder 12, and reradiated through tag antenna subsystem 50 having a linear polarization whose angular relation to that of interrogator receiving antenna 41 is dependent upon the article carrying tag 13, but is of no deleterious effect upon its reception by the circularly polarized interrogator receiving antenna 41.

In addition to the aspects of the present invention noted above, other alternatives and features should now be apparent. For example, the ID system 10 described and illustrated herein is representative of any surveillance and identification system suitable for use with the antenna system of the present invention. Also, while the crossed-dipole-feed is believed to be the most economical and manufacturable, any configuration of interrogator antenna subsystem 30 producing circular polarization should be likewise suitable for use with the present invention. Thus, interrogator antenna subsystem 30 may employ two spatially crossed antennas of the same type (dipoles, or its dual, slots) or two superimposed complementary antennas (a dipole and a slot).

Moreover, while circular polarization of interrogator antenna subsystem 30 is believed preferably suited for the majority of surveillance and identification applications, it will be recalled that such polarization is a special case of elliptical polarization, and that particularly for other applications where tag 13 orientations may vary only within some spatial limitations, such elliptical polarizations may be suitable for use without departing from the spirit of the present invention. Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art pertaining to antennas for surveillance and identification systems.

I claim:

1. In a system for article surveillance and identification, an antenna system comprising:
   interrogating transmitting antenna means for radiating an electromagnetic interrogation signal at a center frequency and having an elliptical polarization in a first-handed direction;
   transponder antenna means for receiving said electromagnetic interrogation signal and reradiating a modified electromagnetic interrogation signal having a linear polarization; and,
   interrogating receiving antenna means for receiving said modified electromagnetic interrogation signal at substantially said center frequency and having an elliptical polarization in a direction opposite to that of said first-handed direction.

2. An antenna system, as set forth in claim 1, wherein said elliptical polarization in a first-handed direction of said interrogating transmitting antenna means is circular in one of a right-handed and left-handed direction, and said elliptical polarization in a direction opposite that of said first-handed direction of said interrogating transmitting antenna means is circular in one of a right-handed and left-handed direction opposite that of said first-handed direction.

3. An antenna system, as set forth in claim 2, wherein said interrogating transmitting antenna means is a cavity-backed transmitting antenna including feed means inducing circular polarization in said radiated electromagnetic interrogation signal, and said interrogating receiving antenna means is a cavity-backed receiving antenna including feed means for inducing a circularly polarized field for receiving said modified interrogation signal.

4. An antenna system, as set forth in claim 3, wherein said cavity-backed transmitting antenna includes a cavity of square cross-section, and said cavity-backed receiving antenna includes a cavity of square cross-section.

5. An antenna system, as set forth in claim 4, wherein said feed means of said cavity-backed transmitting antenna is a crossed dipole and said feed means of said cavity-backed receiving antenna is a crossed dipole.

6. An antenna system, as set forth in claim 5, further including interrogating antenna cavity housing means for carrying said transmitting antenna cavity and said receiving antenna cavity.

7. An antenna system, as set forth in claim 1, wherein transponder antenna means includes a dipole antenna having two paddle-shaped radiating members formed upon a substrate, each paddle-shaped radiating member having an end centrally disposed on said substrate terminating at an angle whereby the impedance of said dipole antenna substantially matches the impedance of the transponder circuit in electrical connection therewith.

8. A transponder interrogator antenna system for article surveillance and identification comprising:
   interrogating transmitting antenna means for radiating an electromagnetic interrogation signal at a preselected, instantaneous center frequency and having an elliptical polarization in a first-handed direction; and,
   interrogating receiving antenna means for receiving a modified electromagnetic interrogation signal at substantially said preselected, instantaneous center frequency and having an elliptical polarization in a direction opposite to that of said first-handed direction.

9. A transponder interrogator antenna system, as set forth in claim 8, wherein said interrogating transmitting antenna means is a cavity-backed transmitting antenna including feed means inducing circular polarization in said radiated electromagnetic interrogation signal, and said interrogating receiving antenna means is a cavity-backed receiving antenna including feed means for inducing a circularly polarized field for receiving said modified interrogation signal, and further including cavity housing means for carrying said cavity-backed transmitting antenna and said cavity-backed receiving antenna.

10. A transponder interrogator antenna system, as set forth in claim 9, wherein in said cavity-backed transmitting antenna includes a cavity of square cross-section, and said cavity-backed receiving antenna includes a cavity of square cross-section.

11. A transponder interrogator antenna system, as set forth in claim 10, wherein said feed means of said cavity-backed transmitting antenna is a crossed dipole and said feed means of said cavity-backed receiving antenna is a crossed dipole.

12. A transponder antenna system for article surveillance and identification comprising:

transponder antenna means for receiving an electromagnetic interrogation signal at a preselected frequency and reradiating a modified electromagnetic interrogation signal at substantially said preselected frequency and having a linear polarization, said transponder antenna means including a dipole antenna having two substantially paddle-shaped radiating members formed upon a substrate, each paddle-shaped radiating member having an end centrally disposed on said substrate terminating at an angle whereby the impedance of said dipole antenna substantially matches the impedance of the transponder circuit in electrical connection therewith.

* * * * *